Feb. 6, 1968     H. A. FAERBER     3,367,288
CONFECTIONERY MOULD IMPRESSOR
Filed Oct. 20, 1965
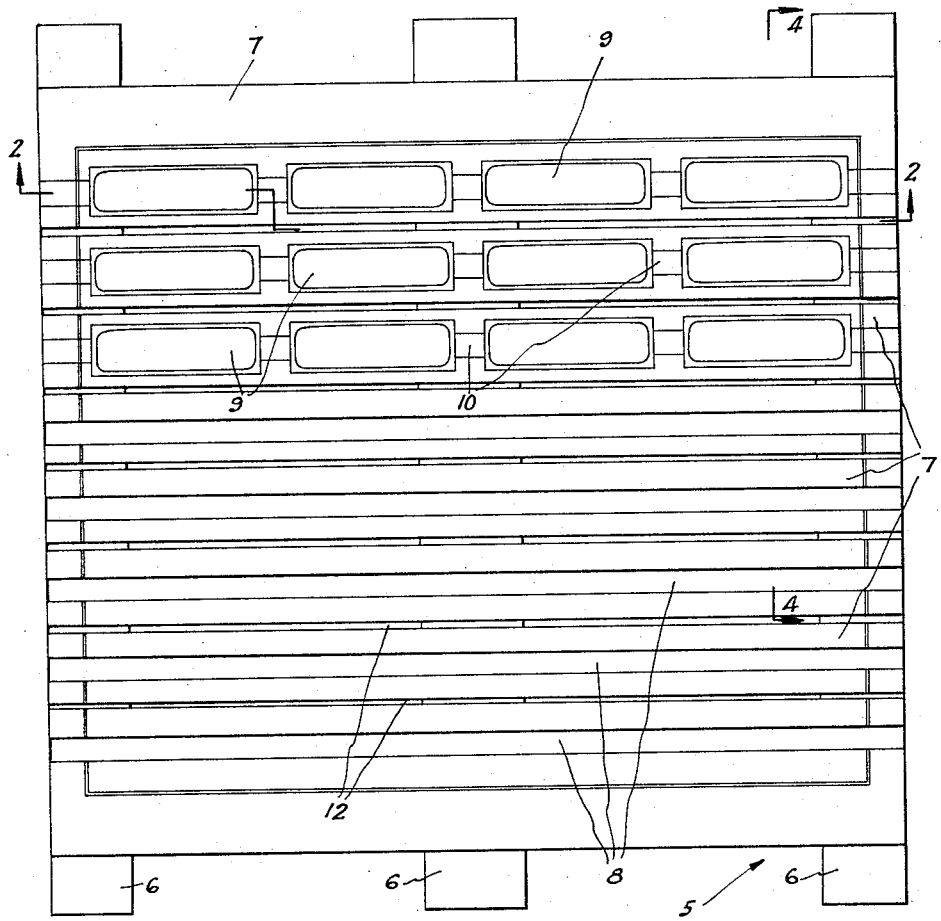
FIG_1.
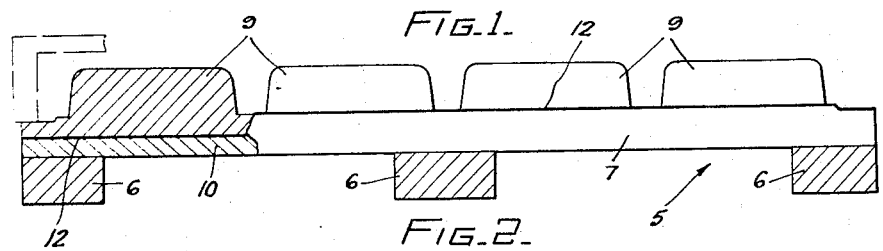
FIG_2.
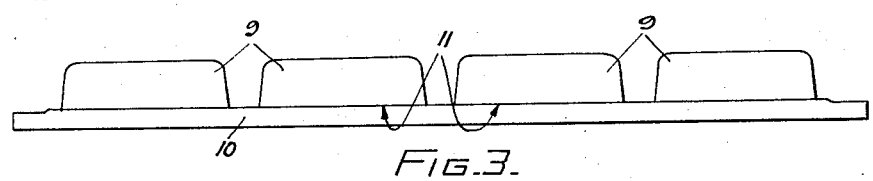
FIG_3.
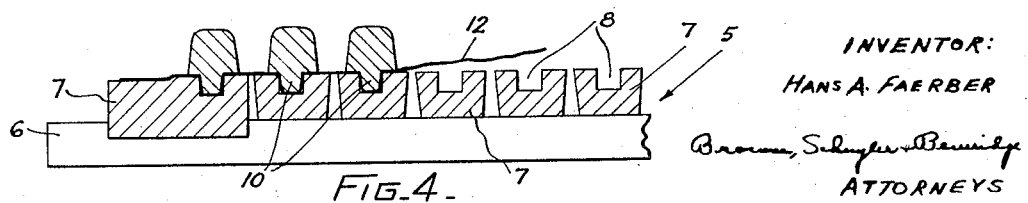
FIG_4.
INVENTOR:
HANS A. FAERBER
Brown, Schuyler & Beveridge
ATTORNEYS 3,367,288
CONFECTIONERY MOULD IMPRESSOR
Hans Arthur Faerber, Castle Cove, New South Wales, Australia, assignor to Nid Pty. Limited, Alexandria, near Sydney, Australia, a corporation of Australia
Filed Oct. 20, 1965, Ser. No. 498,234
4 Claims. (Cl. 107—3)

ABSTRACT OF THE DISCLOSURE

A moulding platen assembly comprising a platen body having a plurality of grooves in its under surface, an air pervious sheet extended over the under surface of the platen body, and a plurality of pattern pieces arranged in groups and held in a predetermined array by back bars extending from piece to piece in each group. The back bars are received in the grooves of the platen body and have a width less than the width of the pattern pieces so that the back surfaces of the pattern pieces project laterally beyond the back bars and contact the perforated sheet.

This invention relates to the moulding of confectionery by the deposition of a settable liquid or semi-liquid confection substance into mould cavities formed in a moulding medium of particulate or powder form. Generally, the moulding medium is a starch powder and the process is referred to as starch moulding.

Starch moulding is now carried out at high speed by automatic or semi-automatic machines and likewise the mould cavities in the starch powder are usually mechanically formed.

The mechanisms which form the mould cavities do so by filling trays with the moulding medium, screening off the surface of the medium to provide a completely filled tray in which the exposed surface of the medium is flat, and lowering a platen having a plurality of pattern pieces depending from it onto the medium in the tray so as to impress the pattern pieces into the medium and produce a plurality of mould cavities therein corresponding to said pattern pieces.

Hitherto, several types of platens have been proposed, for example, a platen comprising of a grid of timber strips in a surrounding frame with wooden or other patterns secured individually to the strips has been used.

Because the tray is initially full of moulding medium it will be appreciated that the medium has, in effect, to be compressed or densified to provide the cavity space displaced by the pattern pieces. Such densification causes the expulsion of air from between the particles of powder which then becomes more closely packed.

As the air escapes there is a tendency for the powder to be carried away with it and the surface of the powder between the mould cavities is likely to be disturbed. Such disturbance is undesirable, for if there is not a perfectly flat surface on the starch, with no loose starch on top near the mould cavities, there is a tendency for starch to fall into the finished cavities. As a result, it has been customary to apply a sheet of gauze or a silk screen to the undersurface of the timber grid before fixing the pattern pieces to it. That screen serves to flatten or hold the surface of the starch in place while allowing the air to escape.

It has been previously proposed, in the interests of positional accuracy and indestructability compared to plaster moulds to provide metal or other strip-like pattern elements comprising a plurality of precisely positioned pattern pieces projecting integrally from a backing strip for affixture to the undersurface of the said grid or its equivalent instead of the individual pattern pieces previously used.

Although the consequent improvement in the accuracy of the spacing of the pattern pieces is desirable, the use of pattern pieces which are integral with a backing strip has not been widely adopted because the before mentioned gauze screen (which is necessarily interposed between the timber grid and the back surface of the backing strip) is spaced from the starch surface when the pattern pieces are fully impressed into the starch (that is when the front surfaces of the backing strips contact the starch surface) by the thickness of the backing strip of each pattern element, and upon moulding and withdrawing, ridges of starch formed in the spaces between adjacent srtips are left. Those ridges are then likely to fall into the mould cavities during movements of the tray, causing production of scrap sweets.

An object of the present invention is to provide a moulding platen of the kind under discussion which provides for accurate positioning of the pattern pieces by having those pieces united in groups but which at the same time permits an air pervious sheet to be applied in the same position as is customary when individually fixed pattern pieces are used.

The object achieves that invention by providing a platen comprising a perforated platen body having a plurality of positioning grooves in its underface, an air pervious sheet extended over the underface of said body, and a plurality of pattern pieces arranged in groups and held in a predetermined array by one or more back bars extending from piece to piece in the group; said back bars being housed in said grooves to bring the back surfaces of the pattern pieces projecting beyond the bars into contact with the air previous sheet.

By way of example, a platen according to the invention is described hereinafter with reference to the accompanying drawings.

FIG. 1 is a plan view of a platen with its pattern pieces projecting upwardly (not all of the pattern pieces which would normally be present are shown).

FIG. 2 is a sectional view taken on line 2—2 of FIG. 1.

FIG. 3 is a side elevation of a pattern element, being a component of the platen of FIG. 1.

FIG. 4 is a sectional view taken on line 4—4 of FIG. 1.

The illustrated platen comprises a perforated platen body 5 comprising three timber stringers 6 and a plurality of timber transverse grid members 7 secured thereto. Thus, the platen body is substantially conventional in construction except for a plurality of accurately spaced apart, mutually parallel, positioning grooves 8 formed in those surfaces of the grid members 7 which are underneath when the platen is in use.

Rows of pattern pieces 9 are provided. Only three such rows are shown in FIG. 1 but usually the platen would have as many rows as possible. In the present case one row is associated with each grid member 7.

The pattern pieces 9, which may be metal or plastic mouldings, of each row are united by one or more relatively narrow, rigid back bars 10 which are preferably moulded integrally with the pattern pieces of the row. The arrangement is such that the bar 10 of each row of pattern pieces may be embedded within the corresponding groove 8 of the platen body so that the upper or back surfaces 11 of the pattern pieces 9 projecting beyond the relatively narrow bars 10 may contact a silk screen, wire gauze, or other woven or cellular air pervious sheet 12 applied to the underface of the platen body.

Not only does the above described arrangement provide for the accurate positioning of the pattern pieces 9 inherent in the percise positioning of the bars 10 in machine made grooves but also the relative narrowness of those bars, means that the bars themselves do not constitute a series obstacle to the escape of air from the starch powder or other moulding medium.

It will be appreciated that the illustrated pattern pieces 9 are very simple in shape and in practice they would usually be more elaborately shaped to provide confections in the form of models of articles of one kind or another or of a more ornamental character. It may be that the pattern pieces are relatively large, in which event each row thereof may be integral with more than one back bar. If desired, the housing grooves for the back bars (corresponding to grooves 8) may extend transversely of the grid members 7 instead of longitudinally thereof.

According to other examples of the invention the pattern pieces are grouped by affixture to a grid-like arrangement of back bars adapted to be inserted into a corresponding grid-like array of positioning grooves.

What I claim is:

1. A moulding platen assembly comprising in combination, a perforated platen body having a plurality of positioning grooves in its under surface, an air pervious sheet extended over the under surface of said body with portions of the sheet received in said grooves, a plurality of pattern pieces arranged in groups, a number of back bars rigidly interconnecting the pattern pieces in each group to maintain them in a predetermined array, said back bars being housed in said grooves and having a width less than that of the pattern pieces such that the back surfaces of the pattern pieces project laterally beyond the back bars into contact with the air pervious sheet.

2. A platen according to claim 1 wherein said platen body is a timber grid.

3. A platen according to claim 1 wherein the pattern pieces of each group are arranged in a row with the back bar or bars of that group extending longitudinally of the row.

4. The moulding platen assembly defined in claim 1 wherein said back bars and said pattern pieces are formed integral with each other.

References Cited

UNITED STATES PATENTS

| | | | |
|---|---|---|---|
| 699,687 | 5/1902 | Kellogg | 107—3 |
| 844,911 | 2/1907 | Baroody | 107—3 |
| 2,818,822 | 1/1958 | Greenberg | 107—3 |

FOREIGN PATENTS

| | | |
|---|---|---|
| 147,467 | 7/1952 | Australia. |

WALTER A. SCHEEL, *Primary Examiner.*

J. M. NEARY, *Assistant Examiner.*